United States Patent Office 3,455,386
Patented July 15, 1969

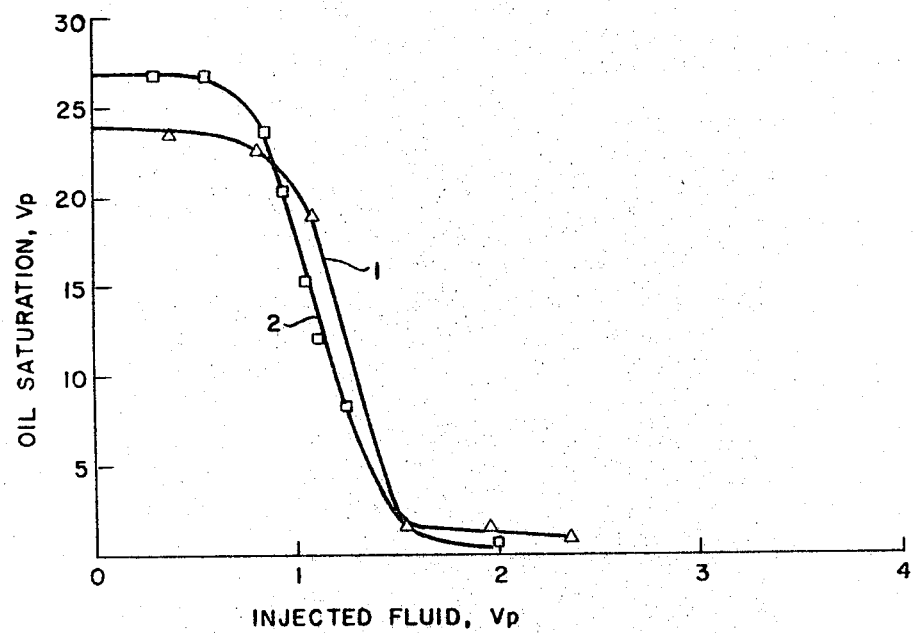
FIG. I
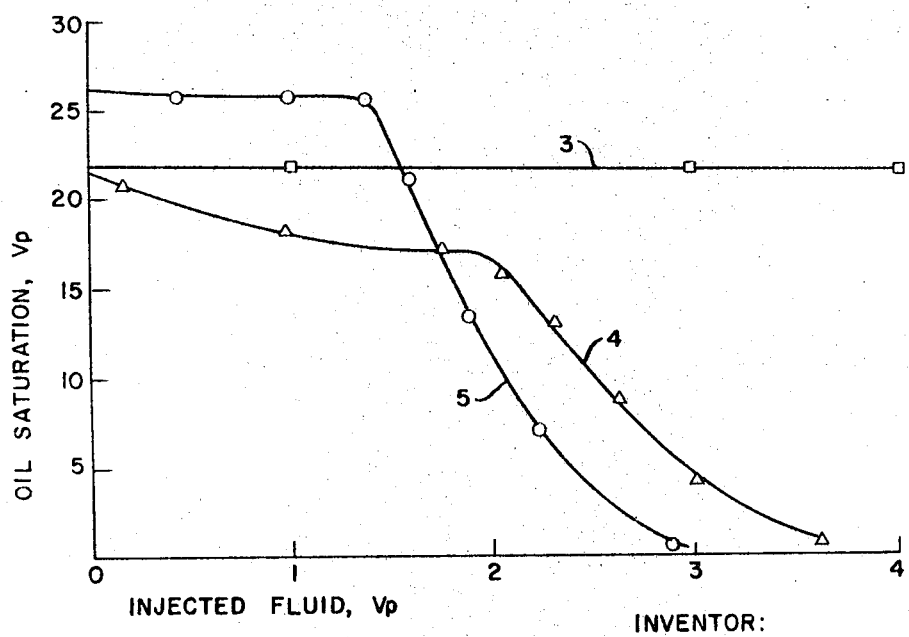
FIG. 2
INVENTOR:
JOSEPH REISBERG

3,455,386
SECONDARY RECOVERY METHOD USING
NON-IONIC SURFACTANT MIXTURES
Joseph Reisberg, Houston, Tex., assignor to Shell Oil Company, New York, N.Y., a corporation of Delaware
Continuation-in-part of application Ser. No. 359,405, Apr. 13, 1964. This application July 13, 1967, Ser. No. 653,145
Int. Cl. E21b 43/22
U.S. Cl. 166—275
9 Claims

ABSTRACT OF THE DISCLOSURE

An improvement in recovery of oil using waterflooding comprising incorporating into the waterflooding aqueous liquid a mixture of a water-soluble non-ionic surfactant having a cyclic group of carbon atoms in a concentration exceeding the critical concentration for micelle formation and a relatively water-insoluble, oil-soluble non-ionic surfactant having a cyclic group of carbons in an amount sufficient to swell the non-ionic surfactant micelles and cause said surfactant-containing aqueous fluid to be capable of solubilizing a significant proportion of oil, with said surfactant-containing aqueous liquid being present in at least the frontal portion of the aqueous liquid with which the oil is displaced.

CROSS-REFERENCE TO RELATED APPLICATION

This application is a continuation-in-part of copending application Ser. No. 359,405, filed Apr. 13, 1964, and which issued on July 11, 1967 as U.S. Patent 3,330,344.

BACKGROUND OF THE INVENTION

This invention relates to a fluid drive process for the recovery of hydrocarbons from oil-bearing reservoir formations. More particularly, it pertains to an improved method of flooding such a reservoir with aqueous liquid to effect an effective and efficient secondary or tertiary recovery of oil therefrom.

It is well known that the so-called primary recovery techniques, which include natural flow, gas-lifting, gas-repressurization and pumping techniques, recover only a portion of the oil present in a given oil-bearing earth formation. Even the use of the supplemented primary recovery practices, e.g., use of gas repressuring treatments, and the like, still leaves large quantities of oil, some of which may be adhering to the particles of sand or the particles of the oliferous structure, trapped in pores by capillary and hydrodynamic forces, etc.

For this reason there is a great deal of interest in the so-called secondary recovery techniques, the use of which permits the recovery from the partially depleted formation of additional quantities of oil present therein. These secondary recovery techniques, in general, utilize the principle of augmenting the tendency for oil to flow after the natural drive has been depleted during oil recovery by the aforementioned primary recovery methods. This reservoir energy augmentation is often effected by providing, e.g., by drilling, one or more injection wells extending downwardly into the oil-bearing reservoir formation within suitable proximity to a producing well or wells which have been drilled into the same formation. A liquid or a gas, or mixtures thereof, is then injected through the above-mentioned injection well to drive the oil to and thus increase the oil production from the producing well or wells.

Water, usually in the form of an aqueous solution containing one or more dissolved salts, is often used to displace the oil within a reservoir. In this general method which is commonly designated by the term "waterflooding," an aqueous liquid is pumped through an injection well into the oil-bearing formation to drive the oil from the zone near the point of injection toward a point at which fluid is produced from the formation. Waterflooding is advantageous because the cost of the amount of aqueous liquid required to fill the pore volume of reservoir formation between the points of injection and production is usually significantly less than the value of the oil that is displaced.

Waterflooding is, however, subject to various disadvantages. Most oil-bearing reservoirs comprise porous rocks in which the pores contain at least three, oleaginous, aqueous and solid, immiscible phases and often contain a fourth, gas, immiscible phase. The boundary tensions between these immiscible phases seriously reduces the efficiency of a waterflood by causing a high degree of entrapment due to capillary pressures within the pores of the reservoir formation. In addition, the aqueous fluid tends to bypass or "finger through" the oil and leave a significant amount with the reservoir. The fingering tendency is enhanced by the fact that most aqueous liquids have viscosities that are considerably less than those of the reservoir oils. Thus, to some extent, the recoveries obtainable by waterflooding can be improved by the incorporation of viscosity increasing material into at least the frontal portions of the aqueous drive liquid.

It is known that the displacement efficiency of a waterflood can be improved by injecting a slug of a liquid that is miscible with both oil and water ahead of the aqueous drive liquid and keeping it between the oil and water phases. However, such oil and water miscible materials are relatively very expensive and it is seldom possible to recover and reuse enough to adequately reduce the chemical cost of such an operation.

Alternatively, the displacement efficiency of a waterflood can be improved by incorporating a surfactant into the system. Various procedures have heretofore been employed, such as incorporating a surfactant into an oil miscible liquid injected ahead of the aqueous drive liquid, or forming a surfactant across the oil-water interface. However, in the procedures heretofore employed, any improved drive efficiency that is initially obtained tends to be lost as the drive progresses. A surfactant-containing aqueous system is most efficient when a certain concentration of the surfactant is present in a particular electrolyte. In practical waterflooding operations, the criticality of the concentrations used is increased by the economic necessity of using a minimum amount of the relatively expensive surface-active material. As the drive progresses, the concentration at which the surfactant is present in the frontal portion of the aqueous phase is reduced by the adsorption of the surfactant onto the rocks. In addition, the amount of the reduction in the interfacial tension that is produced by the aqueous solutions or suspensions of surfactants that have heretofore been used is insufficient to reduce the capillary pressure within the pores of the reservoir formation to an extent permitting an efficient displacement of the oil.

It is therefore an object of this invention to avoid the above and other defects of the prior art, and to provide an efficient and economical waterflood method or technique.

It is a further object to provide a waterflooding operation in which at least the frontal portion of an aqueous drive liquid is an unique aqueous liquid that is either miscible with a significant proportion of the reservoir oil, or exhibits a very low interfacial tension, and is composed of relatively low cost ingredients that can be left unrecovered within the reservoir formation without destroying the economic advantages of the water-flooding operation.

It is a further object to provide a process of forcing oil to flow within a permeable earth formation by a miscible displacement with an aqueous liquid that contains a surfactant and an amphiphilic coupling agent in proportions such that the aqueous liquid exhibits a close resemblance to a single phase liquid that is miscible with both oil and water.

It is a further object to provide a process of displacing the oil within a reservoir formation with an oil-solubilizing aqueous liquid, which, if it is forced to finger through and move past a portion of the oil, solubilizes the oil and, in effect, dissolves it in the next portions that contact the oil.

SUMMARY OF THE INVENTION

Many of the above and other objects and advantages of the present invention can be attained by injecting an aqueous liquid drive fluid into an oil-bearing reservoir formation to displace oil towards a point at which fluid is produced from the reservoir formation and maintaining in said aqueous liquid, in at least the frontal portion, an oil-solubilizing aqueous solution of (1) non-ionic surfactant micelles which are water-soluble and contain at least one cyclic group of carbon atoms, a preferred class of which can be represented by the Formula I, namely R—X—(O—R')$_x$OY, where R is a $C_{0-30}$ alkyl radical, preferably $C_{4-18}$ alkyl radical, X is a mono or polycyclic radical, e.g., phenyl or naphthyl or anthryl radical, R' is a $(CH_2)_n$ radical where $n$ is 2 or 3, Y is hydrogen or a hydrocarbyl radical and $x$ is at least 8 and preferably 10–30 and which micelles (1) are combined with (2) non-ionic essentially oil-soluble molecules of an amphiphilic organic compound also containing at least one cyclic group of carbon atoms, a preferred class of which can be represented by the Formula II, namely R—X(O—R')$_y$OY, where R, X, R' and Y are essentially the same as in Formula I but where $y$ is 5 or less, preferably 1–4.

FIGURE 1 graphically illustrates the effects of various non-ionic surfactant mixtures in aqueous electrolyte flooding solutions on total oil recovery; and FIGURE 2 graphically shows the effects on total oil recovery of various non-ionic surfactant mixtures in aqueous flooding solutions in the absence of electrolytes.

DESCRIPTION OF PREFERRED EMBODIMENTS

The characteristics that identify an aqueous solution of surfactant micelles, and the methods by which such solutions are formed, are amply described in the chemical literature relating to colloids. In general, the concentration curves of surfactant solutions in aqueous liquids are known to exhibit striking breaks or inflections when plotted against various physical properties such as surface and interfacial tension, osmotic pressure, electrical conductance and detergency. This region of inflection represents a concentration above which free molecules or ions of the surfactant associate to form highly organized, oriented colloidal aggregates, or "micelles" that are dissolved in the aqueous liquid. This concentration is termed the "critical concentration for micelles formation" (abbreviated CMC).

In the present process an aqueous solution of surfactant micelles, i.e., an aqueous solution of a non-ionic surfactant of (1) and represented by Formula I at a concentration above the CMC, is mixed with sufficient amphiphilic nonionic material of low water solubility of (2) and represented by Formula II to liquefy or disorganize the oriented palisade layer of the micelles. This appears to cause the palisade layer of each micelle to be penetrated by molecules of the amphiphile. It produces a solution of swollen micelles that contain, or are combined with, molecules of an amphiphilic coupling agent. Such a solution is sometimes referred to as a micro-emulsion. The swollen micelles are capable of incorporating either oil or water within their partially disordered lattices and their solutions, or the aqueous systems containing them, are both miscible with additional portions of aqueous liquid and capable of being diluted by considerable amounts of aqueous liquid and capable of solubilizing considerable amounts of hydrocarbons or other non-aqueous liquids. Both the temperature and the electrolyte concentration affect the interfacial tension of a surfactant system. In general, at a given temperature, a given aqueous electrolyte solution of surfactant micelles exhibits a relatively low interfacial tension against a given oil and may even solubilize a minor amount of the oil. However, for practical purposes, the over-all behavior of an aqueous solution, or system containing unswollen micelles is that of a pair of immiscible oil and water phases that exhibit a reduced interfacial tension and an increased tendency toward emulsification, due to the presence of a relatively high concentration of surfactant. In contrast, when the micelles of the same surfactant are swollen by the presence of the amphiphilic molecules, in the conditions, the over-all behavior of the aqueous solution is that of an aqueous liquid having either a high degree of miscibility with the oil or exhibiting a very low interfacial tension (e.g., less $10^{-3}$ dynes per centimeter) against the oil. In a waterflooding operation with the latter solution, if a first portion of the aqueous liquid fails to displace or solubilize all of the oil it contacts, a subsequent portion will solubilize the remainder.

For convenience, the term "solubilizing solution" will be used herein to refer to an aqueous solution that (1) contains a non-ionic surfactant as presented by Formula I in at least the critical concentration for micelle formation, for the ambient temperature, and (2) contains amphiphilic material of low water solubility as represented by Formula II in a concentration sufficient to swell the micelles of the surfactant. The term "low water solubility" is used herein to refer to a solubility of less than about 10 grams per 100 cc. of water at 20° C. As noted above, such solubilizing solutions exhibit numerous characteristics of true solutions that are miscible with oil and water. Where a slug or a discrete body of the solubilizing solution is maintained at the front of an aqueous drive liquid having a composition different from that of the solubilizing solution and the two liquids are sequentially displaced through an oil-bearing reservoir formation, the slug functions like a liquid piston or membrane between the immiscible phases that comprise the last-injected aqueous drive liquid and the reservoir oil. The leading edge of the solubilizing solution is, in effect, miscible with the oil it contacts and the trailing edge of the solubilizing solution is miscible with the aqueous liquid that it contacts. The capability of the solubilizing solution to retain its solubilizing properties while dissolving significantly large proportions of reservoir crudes, or additional aqueous liquid, enables the solubilizing solution to continue to so function during the flow of the fluids within the reservoir formation. Such a displacement drives the reservoir oil, in the form of a bank of oil, ahead of the solubilizing solution. Where fingering occurs the bypassed portions of the oil are continually being solubilized in the solubilizing solution. These properties adapt the present invention for use in reservoirs that contain a high proportion of oil, such as those in which the natural gas drive has ceased to be effective, as well as in reservoirs that have been previously depleted to an oil residual in the order of 30 percent or less of their pore volumes.

In practicing the present invention, the solubilizing solution can be performed at a surface location and injected into the reservoir formation ahead of, or as the frontal portion of, an aqueous drive fluid that is injected into the reservoir. In some situations it is advantageous to inject the solubilizing solution in a volume sufficient for it to comprise the entire aqueous drive fluid. In other situations it is advantageous to inject the solubilizing solution in a volume that is less than the pore volume between the points of injection and production and to displace a slug comprising the solubilizing solution through the reservoir by a subsequent injection of a different aqueous liquid. Alternatively, one or more of the components of the solubilizing mixture can be introduced into the reservoir ahead of the remaining components, and ahead of any subsequently injected aqueous drive liquid, so that the components become mixed, within the reservoir formation, to form the solubilizing solution in situ.

Suitable aqueous liquids include: water, such as natural oil field brines; water solutions of alkali metal hydroxides, such as sodium hydroxide, potassium hydroxide, etc.; water solutions of salts, such as sodium carbonate, sodium chloride, sodium phosphates, polyphosphates, etc., and mixtures thereof. The pH of the aqueous liquid is preferably adjusted to one that is compatible with both an active form of the surfactant and the materials that will be encountered during the passage of the liquid through the reservoir formation.

Suitable water-soluble non-ionic surfactants, a preferred class of which is represented by Formula I, include reaction products of at least 8 moles of an alkylene oxide with an aromatic alcohol such as alkyl phenol, alkyl naphthols, alkyl anthrols or compounds related to phenanthrene; alkylene oxide adducts of petroleum acids having a broad range of boiling points and significant aromaticity, such as petroleum-acid esters of polyhydric alcohols; ethylene oxide adducts of disproportionated rosin acids, or tall-oil pitch, sterols, or ethylene oxide adducts derived from thio-alcohols, which thio-alcohols can be produced from petroleum sulfonates. In each case, such surfactants are preferably utilized in the form of aqueous dispersions of mixtures in which one or more relatively water-soluble surfactants are present in concentrations greater than their CMC, and one or more relatively water-insoluble surfactants are present as amphiphilic molecules that penetrate into and swell micelles of the more water-soluble surfactants. Such water-soluble non-ionic surfactants include: ethers produced by reacting at least 8 moles of ethylene oxide with a mole of a phenol, preferably an alkyl phenol, or an alcohol that contains at least one cyclic group of carbon atoms, e.g., a polyoxyethylene ether of a phenol; polyhydric alcohol esters of carboxylic acids, where at least one cyclic group of carbon atoms is present in either the alcohol or the acid, e.g., analogous compounds or complexes derived from mercaptans, urea complexes, etc., e.g., a polyethylene oxide thioether of an aromatic-substituted mercaptan, or a urea complex of a polyethylene glycol ester of a mixture of rosin acids; mixtures of such compositions, and the like.

Suitable water-soluble non-ionic surfactants are available commercially as Triton X–100 from Rohm-Haas and is an octylphenol-ethylene oxide reaction product having an average of 10 ethylene oxide units per molecule. Other suitable materials include the Steroxes that contain cyclic groups manufactured by Monsanto Chemical Company; Igepals, for example, Igepal CA Extra (a $C_8$ or $C_9$ [alkyl] phenol polyoxyethylene ester), manufactured by General Dyestuff Corporation; Renex 600 (tall oil ester having 16 ethylene oxide moles per mole of tall oil), manufactured by Atlas Powder Company; dinonyl phenol—15 moles of ethylene oxide; naphthenic acids—15 moles of ethylene oxide; disproportionated rosins—15 moles of ethylene oxide; tall oil pitch—15 moles of ethylene oxide; Acintol R (tall oil rosin—15 moles of ethylene oxide).

The other non-ionic surfactant, namely the essentially oil-soluble material, corresponds to the above water-soluble materials and includes reaction products of 1–5 moles of an alkylene oxide with an aromatic alcohol such as alkyl phenol or the like as defined above such as alkyl thiophenols, etc.

Suitable oil-soluble non-ionic surfactants are available commercially as Triton X–45 from Rohm-Haas and is an octyl phenol-ethylene oxide reaction product having an average of about 5 ethylene oxide units per molecule. Other compounds include reaction products of nonyl phenol with from 1–5 moles of ethylene and/or propylene oxide, preferably with from 3–4 moles of ethylene oxide as well as those having the formula $$(C_{14}H_{29})_{2.2}\phi(OCH_2CH_2)_3OH$$

$$C_{14}H_{29}\phi(OCH_2CH_2)_2OH$$

$$C_{14}H_{29}\phi(OCH_2CH_2)_{5.0}OH$$

$C_8H_{17}\phi(OCH_2CH_2)OH$; dinonyl phenol—5 moles of ethylene oxide; naphthenic acids—5 moles of ethylene oxide; disproportionated rosins—5 moles of ethylene oxide; tall oil pitch—5 moles of ethylene oxide; Actinol R (tall oil rosin—5 moles of ethylene oxide).

Suitable mixtures of non-ionic surfactants that contain cyclic groups of carbon atoms and have relatively high- and low-water solubilities can be formed by a variety of procedures. They can be formed by mixing one or more individual ones of such surfactants with each other, before or after mixing them with the specified proportions of aqueous liquid. They can be formed by conducting the etherification, esterification, and/or condensation reactions by which the surfactants are formed under conditions such that the reaction products comprise the specified mixtures of high- and low-water solubility compounds. They can also be formed by reacting the etherification, esterification and/or condensation reactants with compounds having ranges of molecular weights such that the resulting ethers, esters, and/or condensation products comprise the specified mixtures of high- and low-water solubility compounds, or the like procedures.

Still other non-ionic surfactants which may be used are described in "Surfactant Activity," 2nd ed., Moilliet et al., chapter 14.

The numerical concentration of each of said non-ionic additives can be present in the aqueous liquid in amounts of from 0.01% to 20%, preferably between about 0.5% and about 5%.

EXAMPLE

Oil recovery tests were conducted in sand packs one inch in diameter and one foot long. The sand packs had permeabilities of about 3.5 darcies and contained a typical reservoir crude at a waterflood oil residual concentration. With appropriate mixtures of Triton X–100 and Triton X–45 in aqueous electrolyte solution, total oil recovery was obtained as shown in FIGURES 1 and 2 wherein the flow rate was one ft./day at 22–24° C. The effects of sodium chloride and calcium chloride in such mixtures are shown in FIGURE 1 wherein curve 1 is an aqueous solution containing 2.25% Triton X–45, 0.75% Triton X–100 and 1.25 M NaCl and curve 2 is an aqueous solution containing 2.25% Triton X–45, 0.75% Triton X–100 and 1.0 M $CaCl_2$. In FIGURE 2 the non-ionic surfactants were used in absence of electrolyte and curve 3 is an aqueous solution containing 3% Triton X–100, curve 4 is an aqueous solution containing 3% Triton X–45 and curve 5 is an aqueous solution containing 2.25% Triton X–45 and 0.75% Triton X–100. In FIGURE 1, oil recovery is essentially complete following the injection of about 1.5 pore volumes of the non-ionic system shown in said figures. Also, these non-ionic mixtures exhibit a high tolerance to electrolytes as evidenced by reference to FIGURE 1.

Other examples of mixtures are illustrated by the following examples in which the carrier is water which may contain an electrolyte such as NaCl or $CaCl_2$.

| Additive mixture: | Mole ratio |
|---|---|
| Dinonyl phenol—5EO+ | 3 |
| Dinonyl phenol—15EO | 1 |
| Naphthenic acids—5EO+ | 4 |
| Naphthenic acids—15EO | 1 |
| Disproportionated rosins—5EO+ | 2 |
| Disproportionated rosins—15EO | 1 |
| Tall oil pitch—5EO+ | 3 |
| Tall oil pitch—15EO | 1 |
| Acintol R (tall oil rosin)—5EO+ | 3 |
| Acintol R (tall oil rosin)—15EO | 1 |

The foregoing description of the invention is merely intended to be explanatory thereof. Various changes in the details of the described method may be made within the scope of the appended claims without departing from the spirit of the invention.

I claim as my invention:

1. An improvement in waterflooding operations for recovering oil from subterranean reservoirs involving the injection of water through at least one injection borehole penetrating said reservoir, forcing said water into reservoir through said injection borehole, and recovering oil displaced from said reservoir by said water at a location spaced from said injection borehole, said improvement comprising incorporating in at least the initial portion of said water a mixture of (1) a water soluble non-ionic polyoxylated organic surfactant having at least 8 oxyalkylene units in the molecule and (2) an oil-soluble non-ionic surfactant, said oil-soluble non-ionic polyoxylated organic surfactant having less than 5 oxyalkylene units in the molecule, said water-soluble surfactant being present in at least critical micelle concentration for the ambient temperature, said oil-soluble surfactant being in a concentration sufficient to swell the micelles of the water-soluble surfactant, whereby the interfacial tension between said portion of said aqueous liquid containing said mixture and the residual oil in said reservoir is substantially reduced enabling said portion to displace said oil from said reservoir with greater efficiency.

2. The improvement according to claim 1 wherein both water-soluble and oil-soluble non-ionic surfactants have a cyclic group of carbon atoms in the molecule.

3. The improvement according to claim 1 wherein the portion of the water solution containing the mixture of water-soluble and oil-soluble non-ionic surfactants contains an electrolyte.

4. The improvement according to claim 3 wherein the reservoir into which said surfactant-containing water solution is injected contains a water-soluble salt of an alkaline earth metal.

5. The improvement according to claim 3 wherein the electrolyte is sodium chloride.

6. The improvement according to claim 1 wherein the water-soluble non-ionic surfactant is a reaction product of an aromatic alcohol and alkylene oxide having at least 8 alkylene oxide units in the molecule and the oil-soluble non-ionic surfactant is a reaction product of an aromatic alcohol and akylene oxide having less than 5 alkylene oxide units in the molecule.

7. The improvement according to claim 1 wherein both the water-soluble and oil-soluble non-ionic surfactants are derived from alkyl phenol and ethylene oxide.

8. The improvement according to claim 7 wherein the water-soluble non-ionic surfactant contains at least 10 ethylene oxide units in the molecule and the oil-soluble non-ionic surfactant contains from 3–4 ethylene oxide units in the molecule.

9. The improvement according to claim 1 wherein both the water-soluble and oil-soluble surfactants are ethylene oxide adducts of the thioalcohol derivatives of petroleum sulfonate mixtures of low and high molecular weight sulfonates.

References Cited

UNITED STATES PATENTS

| | | | |
|---|---|---|---|
| 3,082,822 | 3/1963 | Holm et al. | 166—9 |
| 3,163,214 | 12/1964 | Csaszar | 166—9 |
| 3,254,714 | 6/1966 | Gogarty et al. | 166—9 |
| 3,275,075 | 9/1966 | Gogarty et al. | 166—9 |
| 3,297,084 | 1/1967 | Gogarty et al. | 166—9 |
| 3,307,628 | 3/1967 | Sena | 166—9 |
| 3,401,748 | 9/1968 | Stratton | 166—9 X |

OTHER REFERENCES

Uren: Petroleum Production Engineering (Development), 4th edition, McGraw-Hill Book Company, 1956, pp. 443–445 relied on.

STEPHEN J. NOVOSAD, Primary Examiner

U.S. Cl. X.R.

252—8.55